(12) United States Patent
Nakamura et al.

(10) Patent No.: US 12,413,835 B2
(45) Date of Patent: Sep. 9, 2025

(54) IMAGING DEVICE, SHIELD, AND METHOD OF MANUFACTURING IMAGING DEVICE

(71) Applicant: Panasonic Intellectual Property Management Co., Ltd., Osaka (JP)

(72) Inventors: Ken Nakamura, Kanagawa (JP); Kazufumi Takeshita, Tokyo (JP); Yoshiki Usui, Kanagawa (JP); Toshihiro Murakami, Kanagawa (JP); Masayuki Yoshie, Aichi (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 137 days.

(21) Appl. No.: 18/485,979

(22) Filed: Oct. 12, 2023

(65) Prior Publication Data
US 2024/0040217 A1     Feb. 1, 2024

Related U.S. Application Data

(63) Continuation of application No. PCT/JP2022/018069, filed on Apr. 18, 2022.

(30) Foreign Application Priority Data

Jun. 2, 2021     (JP) ................................. 2021-093117
Aug. 3, 2021    (JP) ................................. 2021-127776

(51) Int. Cl.
*H04N 23/52*     (2023.01)
*H04N 23/51*     (2023.01)
(Continued)

(52) U.S. Cl.
CPC ............. *H04N 23/52* (2023.01); *H04N 23/51* (2023.01); *H04N 23/54* (2023.01); *H04N 23/55* (2023.01)

(58) Field of Classification Search
CPC ................. H04N 23/55; G03B 17/02; G03B 2205/0007; G03B 2205/0046; G03B 30/00; G03B 9/06; G02B 5/005
See application file for complete search history.

(56) References Cited

U.S. PATENT DOCUMENTS 10,766,431 B2    9/2020  Koshiba et al.
2011/0199485 A1*  8/2011  Nakamura ........... G02B 13/001
                                              348/148
(Continued)

FOREIGN PATENT DOCUMENTS

JP      2007028430 A  *  2/2007
JP      2008211378 A  *  9/2008
(Continued)

OTHER PUBLICATIONS

English translation of International Search Report, mailed Jul. 5, 2022, for PCT Patent Application No. PCT/JP2021/018069. (2 pages).

*Primary Examiner* — Abdelaaziz Tissire
(74) *Attorney, Agent, or Firm* — Seed Intellectual Property Law Group LLP

(57) ABSTRACT

An imaging device according to the present disclosure includes a lens unit, a substrate, a housing, and a shield. The lens unit includes a lens barrel in which a lens is disposed. The substrate is disposed on an emission side of light from the lens barrel. The substrate includes a first surface on which an imaging element receiving the light is mounted. The housing houses the lens unit and the substrate. The shield is provided in the housing to face the first surface of the substrate.

12 Claims, 11 Drawing Sheets

(51) Int. Cl.
*H04N 23/54* (2023.01)
*H04N 23/55* (2023.01)

(56) References Cited

U.S. PATENT DOCUMENTS

| | | | |
|---|---|---|---|
| 2019/0174623 A1* | 6/2019 | Owaki | H04N 23/52 |
| 2020/0195822 A1* | 6/2020 | Agawa | H04N 23/52 |
| 2022/0191360 A1 | 6/2022 | Uno | |
| 2023/0071961 A1* | 3/2023 | Owaki | H04N 23/51 |
| 2023/0080778 A1* | 3/2023 | Owaki | H04N 23/51 |
| | | | 348/148 |

FOREIGN PATENT DOCUMENTS

| | | |
|---|---|---|
| JP | 6234572 B2 | 11/2017 |
| JP | 2019050516 A | 3/2019 |
| JP | 6505807 B2 | 4/2019 |
| JP | 2020177195 A | 10/2020 |

\* cited by examiner

AFTER INSERTING LENS SUBSTRATE ASSY

BEFORE INSERTING LENS SUBSTRATE ASSY

IMAGING DEVICE, SHIELD, AND METHOD OF MANUFACTURING IMAGING DEVICE

CROSS-REFERENCE TO RELATED APPLICATIONS

This application is a continuation of International Application No. PCT/JP2022/018069, filed on Apr. 18, 2022, which claims the benefit of priority of the prior Japanese Patent Application No. 2021-093117, filed on Jun. 2, 2021, and Japanese Patent Application No. 2021-127776, filed on Aug. 3, 2021, the entire contents of which are incorporated herein by reference.

FIELD

The present disclosure relates generally to an imaging device, a shield, and a method of manufacturing the imaging device.

BACKGROUND

With enhancement in performance of sensors, imaging devices such as in-vehicle cameras have been required to have both noise resistance characteristics and heat dissipation properties. From a viewpoint of noise resistance characteristics of the imaging device, a shield is disposed inside a camera case that is an example of a resin housing in the imaging device.

For example, JP 6234572 B2 discloses a technique of covering a side part and a bottom surface of a substrate of an imaging device with a shield.

SUMMARY

An imaging device according to the present disclosure includes a lens unit, a substrate, a housing, and a shield. The lens unit includes a lens barrel in which a lens is disposed. The substrate is disposed on an emission side of light from the lens barrel. The substrate includes a first surface on which an imaging element receiving the light is mounted. The housing houses the lens unit and the substrate. The shield is provided in the housing to face the first surface of the substrate.

DETAILED DESCRIPTION

Hereinafter, embodiments of an imaging device, a shield, and a method of manufacturing the imaging device according to the present disclosure will be described with reference to the drawings.

First Embodiment

Figure 1:
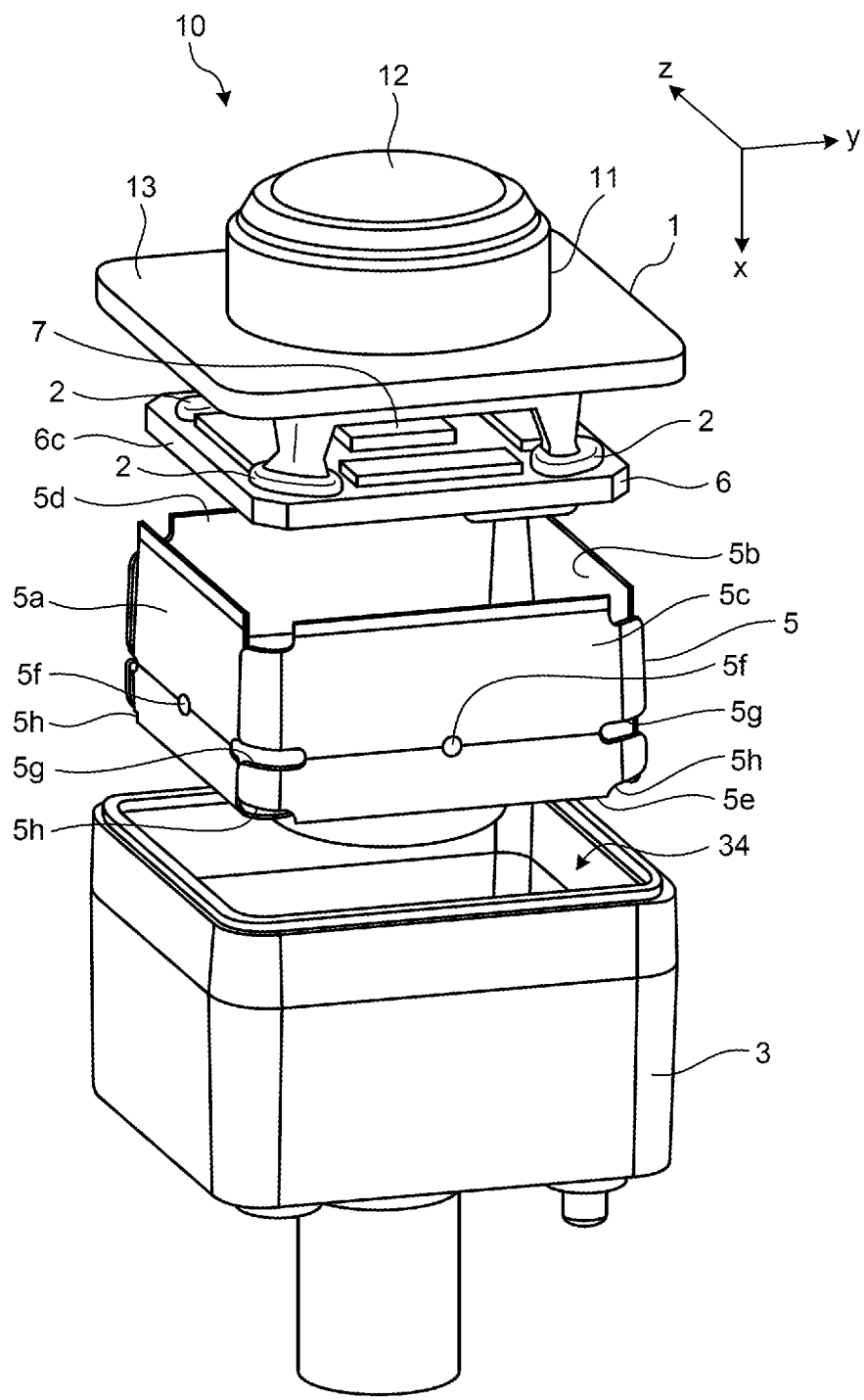
FIG. 1 is an exploded view of an in-vehicle camera as an example of an imaging device according to a first embodiment.
Figure 2:
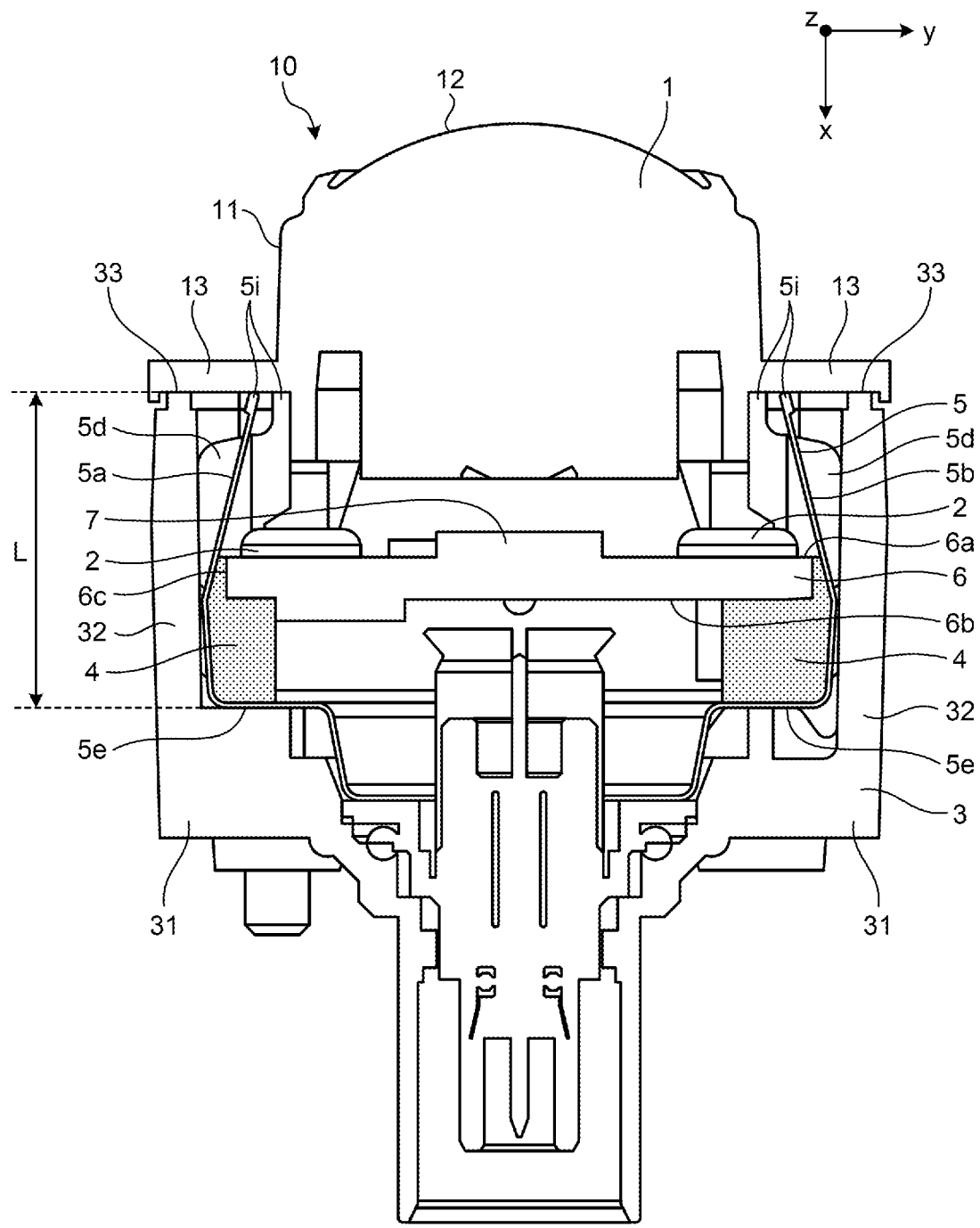
FIG. 2 is a schematic diagram of a longitudinal cross section of the in-vehicle camera according to the first embodiment.
Figure 3B:
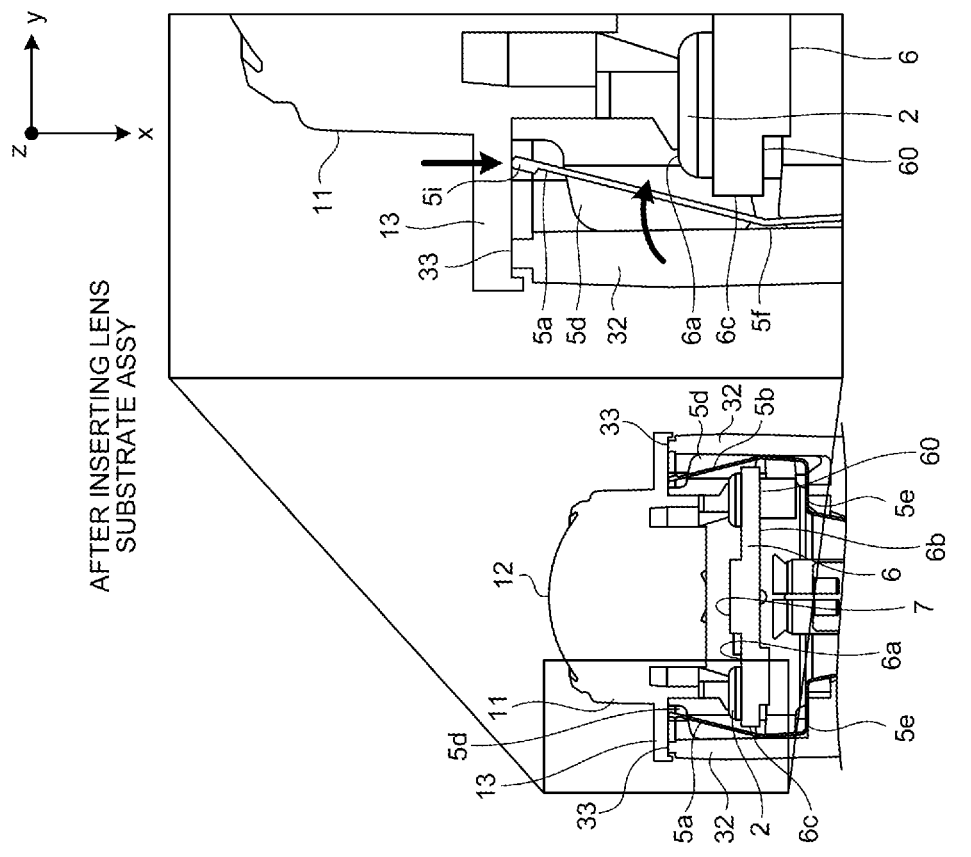
FIG. 3A and FIG. 3B are each a schematic diagram of a longitudinal cross section of the in-vehicle camera according to the first embodiment.
Figure 3A:
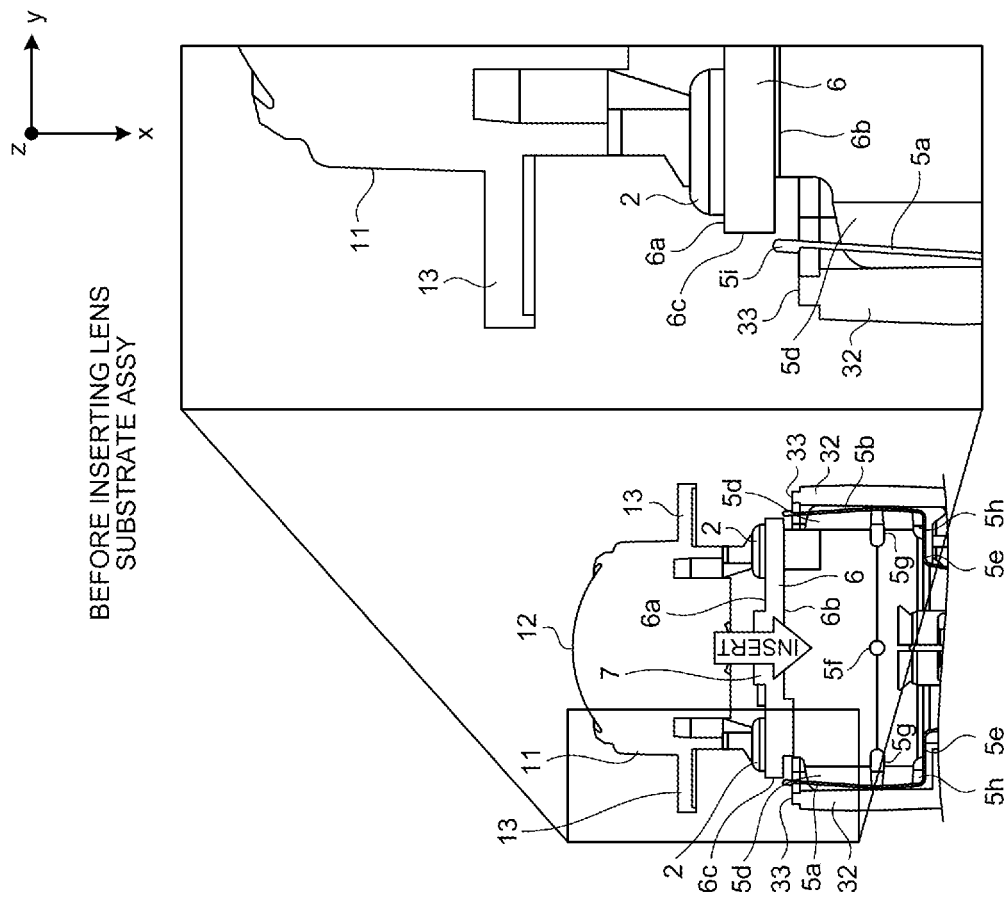
Figure 4:
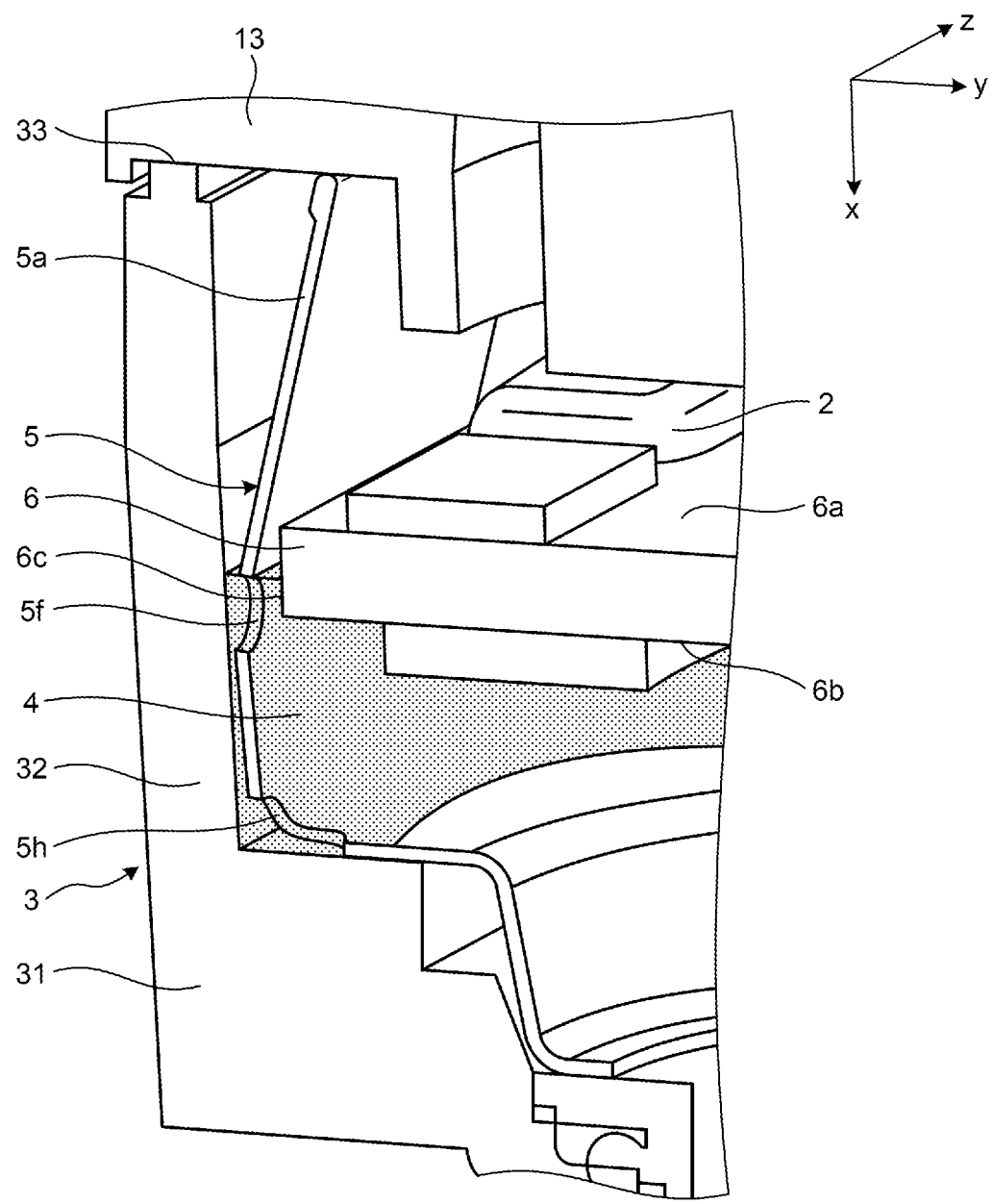
FIG. 4 is a perspective cross-sectional view of the in-vehicle camera according to the first embodiment.

An example of a configuration of an imaging device according to the present embodiment will be described with reference to FIGS. 1 to 4. FIG. 1 is an exploded view of an in-vehicle camera as an example of an imaging device according to the first embodiment. FIG. 2 is a schematic diagram of a longitudinal cross section of the in-vehicle camera according to the first embodiment. FIG. 3A and FIG. 3B are each a schematic diagram of a longitudinal cross section of the in-vehicle camera according to the first embodiment. FIG. 4 is a perspective cross-sectional view of the in-vehicle camera according to the first embodiment.

As illustrated in FIGS. 1 and 2, an in-vehicle camera 10 which is an example of the imaging device according to the present embodiment includes a lens substrate assembly (hereinafter, "ASSY") 1, a camera case 3, a heat dissipation member 4, a shield 5, and a substrate 6.

The lens substrate ASSY 1 is an example of a lens unit including a lens barrel 11 and a lens 12. The lens 12 is disposed inside the lens barrel 11. The lens barrel 11 may be formed by using, for example, a resin material.

In the present embodiment, the lens substrate ASSY 1 includes a cover 13 that covers the periphery of the lens barrel 11. The cover 13 may be formed by using a resin material. In the present embodiment, the entire cover 13 is formed by using a resin material, whereas at least a contact part, which contacts with an upper end 5*i* of the shield 5 to be described later when the substrate 6 is inserted into the camera case 3, may be formed by using a resin material.

The substrate 6 is attached to the lens substrate ASSY 1 with an adhesive 2. In the present embodiment, an adhesive having at least a property of being cured by heat treatment can be used as the adhesive 2. In order to attach the substrate 6 to the lens substrate ASSY 1 with higher accuracy, in other words, in order to optically align the lens barrel 11 (lens 12) and the imaging element 7, the adhesive 2 preferably has a property of being temporarily cured by, for example, ultraviolet (UV) radiation prior to the main curing by heat treatment.

Therefore, in the present embodiment, it is preferable that the adhesive 2 is cured through two steps of temporary curing by UV radiation and main curing by heat treatment. For example, the adhesive 2 may be an adhesive containing an epoxy resin. With such a two-step curing, it is possible to prevent a positional relationship between the lens barrel 11 and the imaging element 7 from deviating during the period from the temporary curing to the main curing.

The substrate 6 is an example of a substrate. The substrate 6 is disposed on a light emitting side from the lens barrel 11. On the substrate 6, the imaging element 7 is mounted. The imaging element 7 is, for example, a complementary MOS (CMOS) or a charge coupled device (CCD). The imaging element 7 is an example of an imaging element that receives light passed through the lens 12. Moreover, the imaging element 7 converts the received light into a video signal. In the present embodiment, corners of the substrate 6 are fixed to the lens substrate ASSY 1 via the adhesive 2.

The camera case 3 is an example of a housing that houses the lens substrate ASSY 1 and the substrate 6. In the present embodiment, the camera case 3 includes an opening 34. The opening 34 is an example of an opening that enables the substrate 6 to be inserted into the camera case 3. The opening 34 is closed (or covered) by the lens substrate ASSY 1.

In the present embodiment, the camera case 3 is a box-shaped housing having an upper surface opening. Specifically, the camera case 3 includes an end wall 31 and a surrounding wall 32. The end wall 31 is formed in a substantially quadrangular plate shape orthogonal to an optical axis of the lens 12. The surrounding wall 32 is formed in a rectangular box shape extending substantially parallel to the optical axis of the lens 12. Moreover, the camera case 3 includes a contact surface 33 that contacts with the lens substrate ASSY 1 when the substrate 6 is housed in the camera case 3.

The shield 5 is provided inside the camera case 3. The substrate 6 is housed in the shield 5. The shield 5 is an example of a shield that covers the substrate 6. The shield 5 is provided to face an upper surface 6a, a side part 6c, and a lower surface 6b of the substrate 6. Specifically, the shield 5 includes shield parts 5a to 5e. The shield part is provided to face a lower surface 6b of the substrate 6 opposite to an upper surface 6a on which the imaging element 7 is mounted. The upper surface 6a and the lower surface 6b are examples of a first surface and a second surface, respectively. The shield parts 5a to 5d are provided to rise from the shield part 5e and provided to face the side part 6c and the upper surface 6a of the substrate 6.

In the present embodiment, the shield parts 5a to 5d extend in a direction orthogonal to the upper surface 6a of the substrate 6, in other words, in an x direction which is an example of a first direction orthogonal to the surface of the substrate 6. Moreover, the shield parts 5a to 5d are provided to obliquely extend from the side part 6c which is a side edge of the substrate 6 toward a position facing the upper surface 6a. That is, the shield parts 5a to 5d are provided to obliquely extend from the side part 6c toward the optical axis of the lens substrate ASSY 1 (lens 12) in a state where the lens substrate ASSY 1 and the substrate 6 are inserted into the camera case 3. Moreover, the lengths of the shield parts 5a to 5d in the x direction are longer than an inner dimension L of the camera case 3 covering the side part 6c of the substrate 6 in the x direction.

Moreover, in the present embodiment, the shield part 5c and the shield part 5d are an example of a first shield pair which is plate-like members disposed to face each other. Moreover, the shield part 5a and the shield part 5b are an example of a second shield pair which is plate-like members disposed to face each other. The shield parts 5a and 5b are preferably inclined inward of the camera case 3 with respect to the shield parts 5c and 5d. Moreover, end parts of the shield parts 5a and 5b partly overlap with the shield parts 5c and 5d.

When the lens substrate ASSY 1 and the substrate 6 are inserted into the camera case 3, the shield parts 5c and 5d are pushed by the cover 13 of the lens substrate ASSY 1 and are inclined toward the inside of the camera case 3 before the shield parts 5a and 5b. Then, overlapping parts of the shield parts 5a and 5b are pushed in accordance with an inclination operation of the shield parts 5c and 5d, whereby the shield parts 5a and 5b are inclined toward the inside of the camera case 3. In other words, the shield parts 5c and 5d are inclined toward the inside of the camera case 3 with a time difference from the shield parts 5a and 5b. Accordingly, when the shield parts 5a to 5d are inclined toward the inside of the camera case 3 along the lens substrate ASSY 1, the shield parts 5a to 5d can be easily bent toward the inside of the camera case 3 without bringing adjacent shield parts into contact with each other.

In the present embodiment, as illustrated in FIG. 3A and FIG. 3B, the upper end 5i (an example of a hemmed edge) of the shield 5 in the x direction is formed by hemming processing such as bending in a U shape. Therefore, when the lens substrate ASSY 1 and the substrate 6 are housed in the camera case 3, friction between the upper end 5i of the shield 5 and the cover 13 of the lens substrate ASSY 1 can be reduced. As a result, it is possible to prevent that the upper end 5i of the shield 5 is caught by the cover 13 and cannot move to the inside of the camera case 3, and the upper surface 6a of the substrate 6 cannot be covered by the shield 5. Moreover, since it is possible to avoid the upper end 5i of the shield 5 from being caught on the substrate 6 when the substrate 6 is housed in the camera case 3, it is possible to prevent the shield 5 from being caught on the substrate 6 and the substrate 6 from being damaged.

Moreover, in the lens substrate ASSY 1, the contact part in contact with the upper end 5i of the shield 5 is preferably made of a resin material. In the present embodiment, the cover 13 of the lens substrate ASSY 1 is made of a resin material. Therefore, when the substrate 6 is housed in the camera case 3, friction between the upper end 5i of the shield 5 and the cover 13 of the lens substrate ASSY 1 can be further reduced. In the present embodiment, the entire cover 13 is formed of a resin material, but at least a contact part of the cover 13 with the upper end 5i of the shield 5 may be formed of a resin material.

Moreover, the shield 5 includes notches or holes 5f and 5g at positions of the substrate 6 in the x direction. Therefore, when the shield parts 5a to 5d are inclined toward the inside of the camera case 3 along the lens substrate ASSY 1, stress is concentrated on the holes 5f and 5g, and a position of the substrate 6 of the shield 5 can be used as a starting point of bending of the shield 5. As a result, when the shield parts 5a to 5d are inclined toward the inside of the camera case 3 along the lens substrate ASSY 1, it is possible to prevent that only the upper part of the shield 5 is bent and the upper surface 6a of the substrate 6 cannot be covered by the shield 5.

As illustrated in FIG. 3A and FIG. 3B, at the time of manufacturing or assembling the in-vehicle camera 10, namely, at the time when the lens substrate ASSY 1 and the substrate 6 are inserted into the camera case 3, the shield parts 5a to 5d are inclined toward the inside of the camera case 3 along the lens substrate ASSY 1. The shield parts 5c and 5d are inclined toward the inside of the camera case 3 along the cover 13 by bringing the upper end 5i, which is an example of the first end on a side of the upper surface 6a of the substrate 6, into contact with the cover 13 of the lens substrate ASSY 1. The overlapping parts of the shield parts 5a and 5b are pushed in accordance with the inclination operation of the shield parts 5c and 5d, whereby the shield parts 5a and 5b are inclined toward the inside of the camera case 3. In the present embodiment, at the time of manufacturing or assembling the in-vehicle camera 10, the shield parts 5a to 5d are inclined toward the inside of the camera case 3 until the cover 13 of the lens substrate ASSY 1 comes into contact with the contact surface 33 of the camera case 3.

Therefore, the upper ends 5i of the shield parts 5a to 5d move to the inside of the camera case 3, and the shield 5 is provided at a position facing the upper surface 6a of the substrate 6, whereby the upper surface 6a of the substrate 6 can be covered with the shield 5. As a result, noise to the substrate 6 from the side of the upper surface 6a of the substrate 6 is reduced, and the noise resistance performance of the in-vehicle camera can be enhanced. Moreover, the shield parts 5a to 5d are inclined toward the inside of the camera case 3 in advance. Therefore, when the upper ends 5i of the shield parts to 5d are inclined along the lens substrate ASSY 1, the shield parts 5a to 5d can be bent toward the inside of the camera case 3 with a low load.

Incidentally, it is also possible to insert mold the shield 5 into the camera case 3 by depositing metal or the like inside the camera case 3 including a lid side (that is, the lens substrate ASSY 1) of the camera case 3. However, the technique of insert-molding the thin shield 5 into the camera case 3 is difficult, and there is a concern that the cost increases.

In contrast to the above, according to the shield 5 of the present embodiment, the periphery of the substrate 6 including a space between the upper surface 6a of the substrate 6 and the lens substrate ASSY 1 can be covered with the shield 5 without changing the members constituting the conventional in-vehicle camera and without using a special method such as insert molding. As a result, the heat dissipation performance and the noise resistance performance of the substrate 6 can be enhanced easily and at low cost.

In the present embodiment, as illustrated in FIG. 4, the holes of the shield 5 includes, in addition to the holes 5f and 5g described above, a hole (opening) 5h penetrating the shield 5 from the space between the shield 5 and the substrate 6 to the space between the shield 5 and the camera case 3.

The hole 5f is a circular hole provided at the center of each of the shield parts to 5d in the y and z directions orthogonal to the x direction. The hole 5g is an elliptical hole provided at an end in the y and z directions of each of the shield parts 5a to 5d. The hole 5h is provided at an end opposite to the upper end 5i of each of the shield parts 5a to 5d in the x direction. In the present embodiment, the hole 5h is provided at an end in the y and z directions of each of the shield parts 5a to 5d. Moreover, in the present embodiment, the holes 5f, 5g, and 5h are circular holes, but may be holes penetrating from a gap between the shield 5 and the substrate 6 to a gap between the shield 5 and the camera case 3, and may be quadrangular holes, for example.

The heat dissipation member 4 is provided in a space between the shield 5 and the substrate 6. Moreover, as illustrated in FIG. 4, when the lens substrate ASSY 1 and the substrate 6 are inserted into the camera case 3, the heat dissipation member 4 is pushed out between the shield 5 and the camera case 3 by the substrate 6 via the holes 5g, and 5h. Therefore, the heat generated in the substrate 6 can be efficiently dissipated to the camera case 3, and the heat dissipation performance of the in-vehicle camera 10 can be enhanced.

The heat dissipation member 4 is a resin material that is cured with the lapse of time. For example, the heat dissipation member 4 may be silicone. Alternatively, the heat dissipation member 4 may be, for example, a heat dissipation member having a base material of silicone, a filler of aluminum hydroxide or aluminum oxide, and a thermal conductivity of 3 W/m·K. Alternatively, the heat dissipation member 4 may be a heat dissipation member having a base material of silicone, a filler of aluminum oxide, and a thermal conductivity of 5 W/m·K.

The heat dissipation member 4 is poured into a gap between the shield 5 and the substrate 6. Then, when the lens substrate ASSY 1 and the substrate 6 are inserted into the camera case 3, the heat dissipation member is poured into the gap between the shield 5 and the camera case 3 via the holes 5f, 5g, and 5h by the substrate 6. The substrate 6, the shield 5, and the camera case 3 are connected by the heat dissipation member 4, and the heat generated in the substrate 6 can be efficiently dissipated to the camera case 3. Therefore, the heat dissipation performance of the in-vehicle camera 10 can be enhanced.

Moreover, when the lens substrate ASSY 1 and the substrate 6 are housed in the camera case 3, the heat dissipation member 4 is pushed out into the gap between the shield 5 and the camera case 3 through the holes 5f, 5g, and 6h by the substrate 6 housed in the camera case 3 by being in a state of not being completely cured. Therefore, the gap between the substrate 6, the shield 5, and the camera case 3 can be reliably filled with the heat dissipation member 4. As a result, heat generated in the substrate 6 can be efficiently dissipated to the camera case 3.

Figure 5:
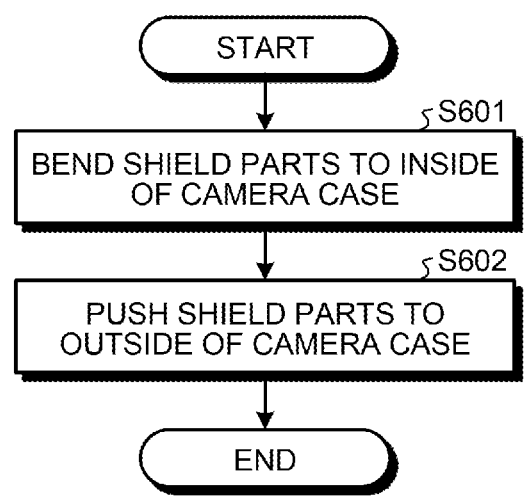
FIG. 5 is a flowchart illustrating an example of a flow of a method of manufacturing the in-vehicle camera according to the first embodiment.

Next, an example of a flow of a method of manufacturing the in-vehicle camera 10 according to the present embodiment will be described with reference to FIG. FIG. 5 is a flowchart illustrating an example of a flow of the method of manufacturing the in-vehicle camera according to the first embodiment.

In the present embodiment, the lens substrate ASSY 1 and the substrate 6 are inserted into the camera case 3. At that time, the upper ends 5i of the shield parts 5a to come into contact with the lens substrate ASSY 1, and the shield parts 5a to 5d are inclined toward the inside of the camera case 3 along the lens substrate ASSY 1 (Step S601). Therefore, the shield parts 5a to 5d can be provided to face the upper surface 6a of the substrate 6.

When the heat dissipation member 4 is poured into the gap between the shield parts 5a to 5e and the substrate 6, the substrate 6 flows the heat dissipation member 4 in the gap between the shield parts 5a to 5e and the substrate 6 into the gap space between the shield parts 5a to 5e and the camera case 3 via the holes 5f, 5g, and 5h (Step S602). The substrate 6, the shield 5, and the camera case 3 are connected by the heat dissipation member 4, and the heat generated in the substrate 6 can be efficiently dissipated to the camera case 3. Therefore, the heat dissipation performance of the in-vehicle camera 10 is enhanced.

As described above, according to the in-vehicle camera 10 of the first embodiment, when the lens substrate ASSY 1 and the substrate 6 are inserted into the camera case 3, the shield 5 can be provided to face the upper surface 6a of the substrate 6 by inclining the shield parts 5a to 5d toward the inside of the camera case 3 along the lens substrate ASSY 1. As a result, noise to the substrate 6 from the side of the upper surface 6a of the substrate 6 is reduced, and the noise resistance performance of the in-vehicle camera 10 can be enhanced.

Second Embodiment

The present embodiment is an example that a lens substrate ASSY includes a stopper. The stopper serves to suppress inclination of the shield to the inside of the camera case after the upper surface of the substrate is covered with the shield, and push the shield to a position of the substrate of the shield in the x direction and the outside of the camera case. In the following description, description of the same configuration as that of the first embodiment is omitted.

Figure 6:
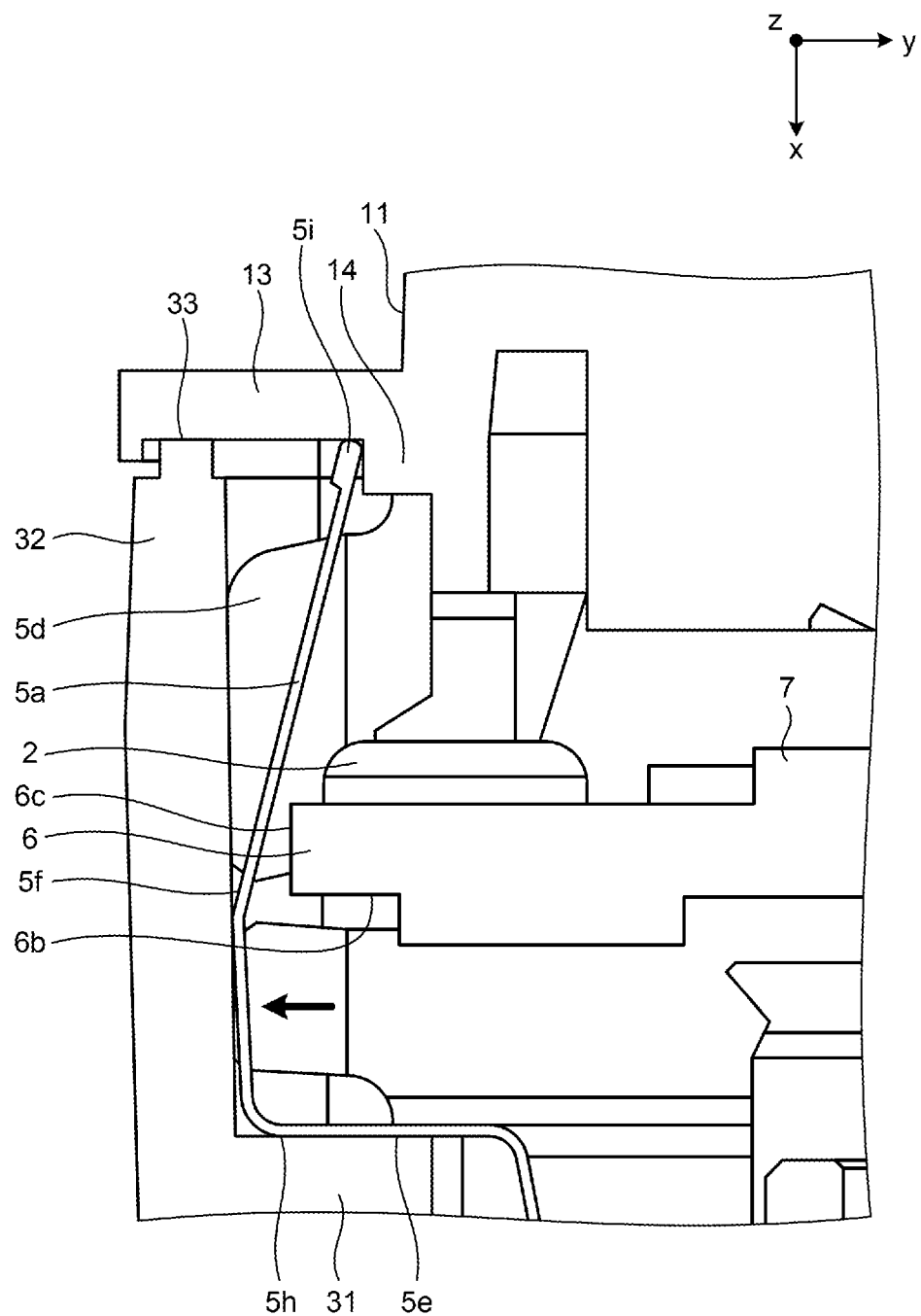
FIG. 6 is a schematic diagram of a longitudinal cross section for explaining an example of a method of manufacturing an in-vehicle camera according to a second embodiment.

An example of a method of manufacturing an in-vehicle camera 10 according to the present embodiment will be described with reference to FIG. 6. FIG. 6 is a schematic diagram of a longitudinal cross section for explaining an example of a method of manufacturing the in-vehicle camera according to the second embodiment.

In the present embodiment, before a substrate 6 is inserted into a camera case 3, a shield 5 is open to the outside of the substrate 6 in the y and z directions.

Thereafter, when the lens substrate ASSY 1 and the substrate 6 are inserted into the camera case 3, a cover 13 of the lens substrate ASSY 1 and an upper end 5*i* of the shield 5 come into contact with each other, and the upper end 5*i* of the shield 5 is pushed into the camera case 3. As a result, the shield parts 5*a* to 5*d* fall into the inside of the camera case 3 and are disposed to face an upper surface 6*a* of the substrate 6.

The cover 13 of the lens substrate ASSY 1 includes a stopper 14. The stopper 14 is an example of a stopper that suppresses inclination of the shield 5 toward the inside of the camera case 3 and pushes a position of the substrate 6 of the shield 5 in the x direction toward the outside of the camera case 3 after the shield 5 is disposed to face the upper surface 6*a* of the substrate 6, in other words, after the upper surface 6*a* is covered with the shield parts 5*a* to 5*d*.

In the in-vehicle camera 10 according to the second embodiment, after the upper surface 6*a* is covered with the shield parts 5*a* to 5*d*, the movement of the upper end 5*i* of the shield 5 is stopped by the stopper 14. Therefore, the position of the substrate 6 in the x direction of the shield 5 is pushed into the outside of the camera case 3. As a result, a gap between the shield 5 and the camera case 3 is reduced, and the heat generated in the substrate 6 can be efficiently dissipated to the camera case 3. Therefore, the heat dissipation performance of the in-vehicle camera 10 can be enhanced.

Third Embodiment

The present embodiment is an example that a lens substrate ASSY is housed in a camera case in a state where a cover of the lens substrate ASSY and a welding ring welded to the camera case are separated from the lens substrate ASSY. In the following description, description of configurations similar to those of the above-described embodiments will be omitted.

Figure 7:
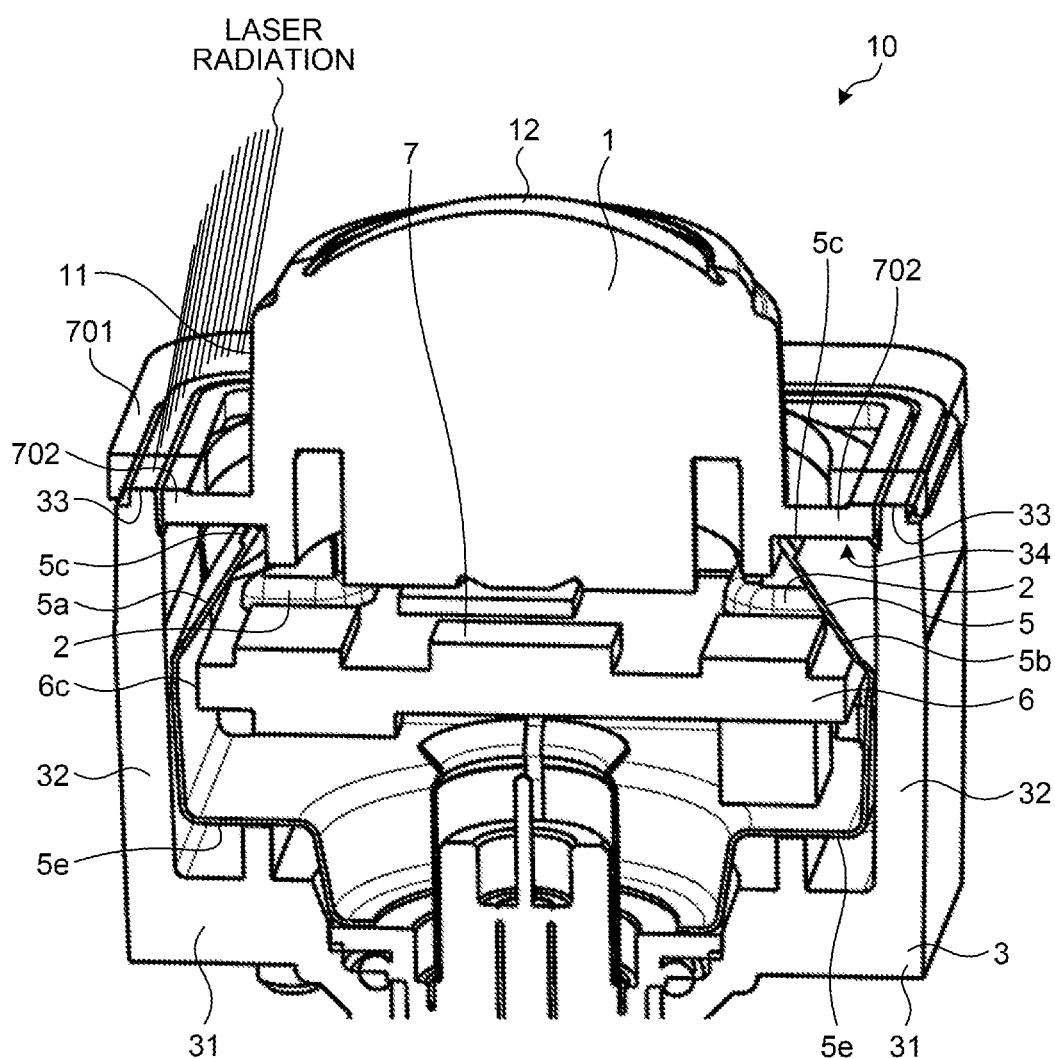
FIG. 7 is a perspective cross-sectional view of an in-vehicle camera according to a third embodiment.
Figure 8:
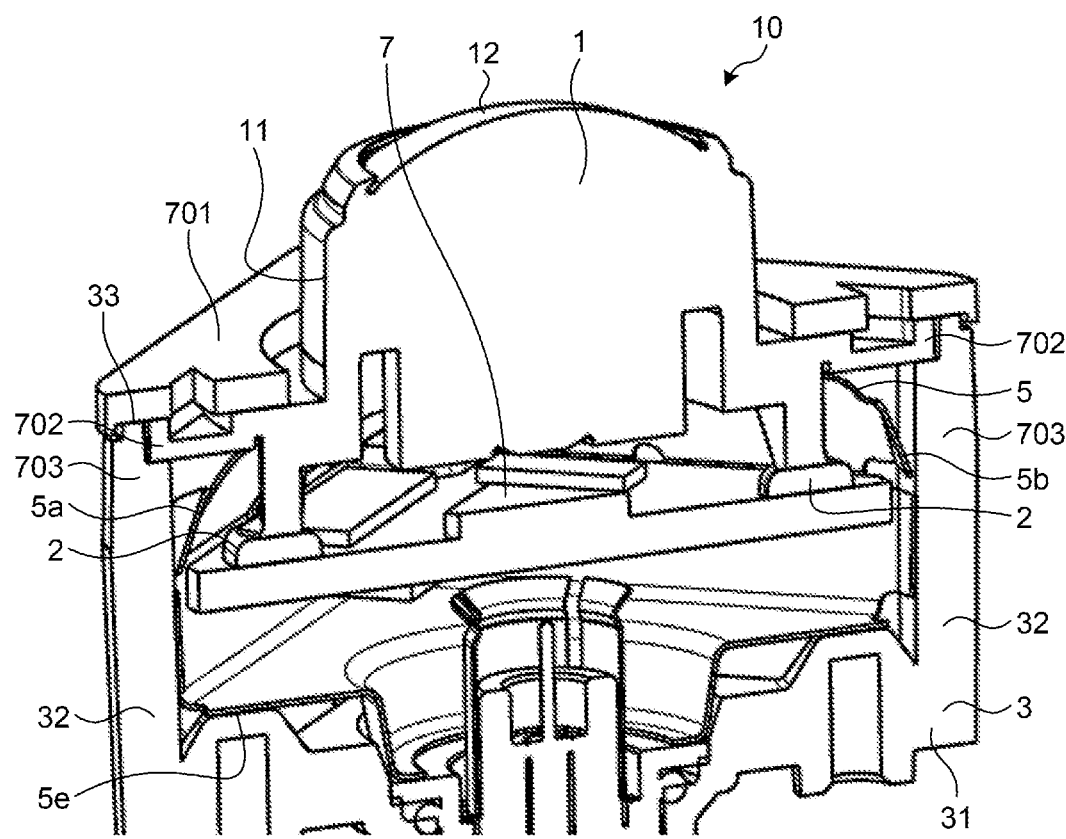
FIG. 8 is a perspective cross-sectional view of the in-vehicle camera according to the third embodiment.
Figure 9:
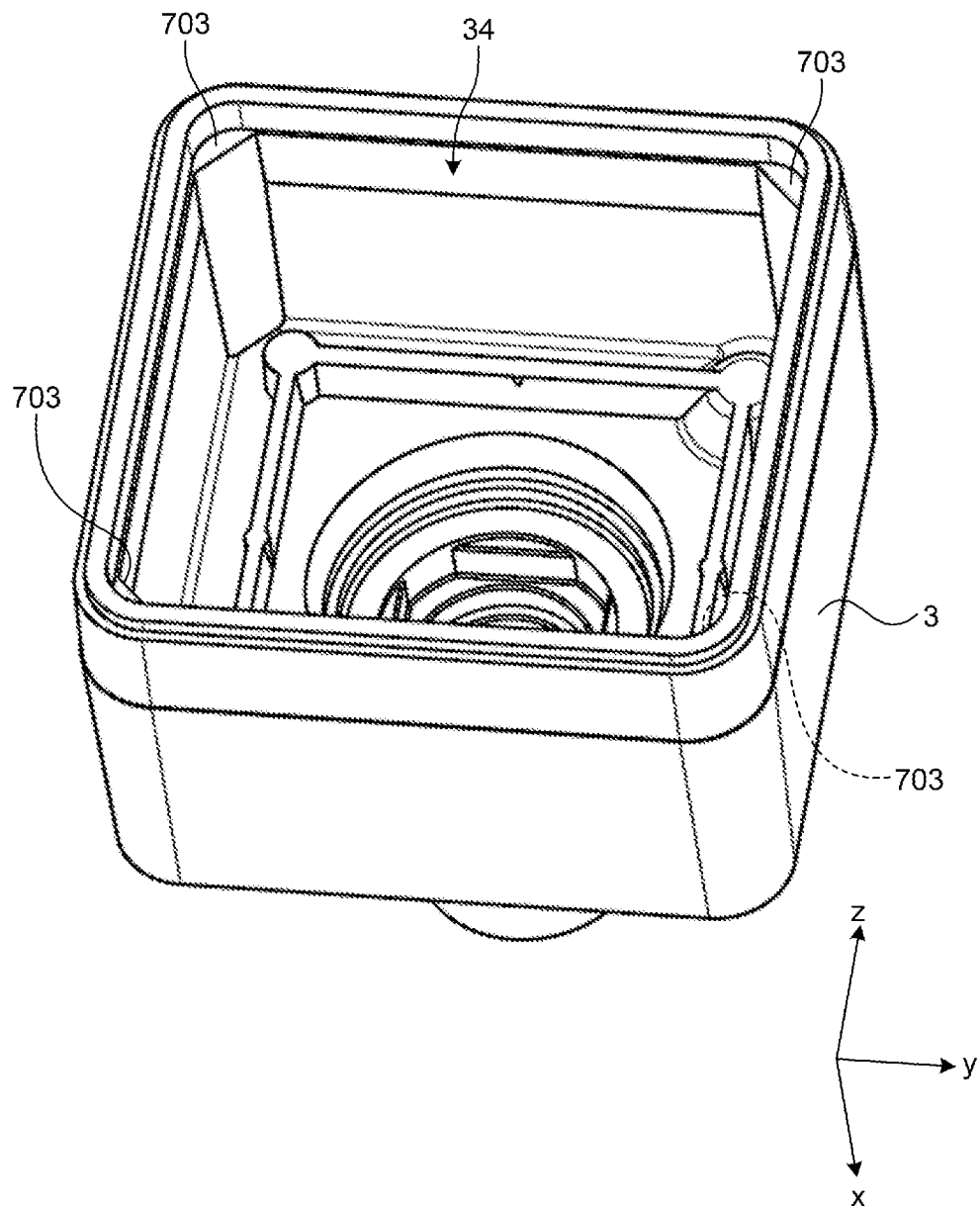
FIG. 9 is a perspective view of a camera case included in the in-vehicle camera according to the third embodiment.

An example of a configuration of an in-vehicle camera 10 according to the present embodiment will be described with reference to FIGS. 7 to 9. FIGS. 7 and 8 are perspective cross-sectional views of the in-vehicle camera according to the third embodiment. FIG. 9 is a perspective view of a camera case included in the in-vehicle camera according to the third embodiment.

In the above-described first and second embodiments, the lens substrate ASSY 1 and a welding ring (701) are welded in advance before the lens substrate ASSY 1 and the substrate 6 are housed in the camera case 3. In other words, in the first and second embodiments, the welding ring has been welded to a cover (702) provided around the lens barrel 11 of the lens substrate ASSY 1. On the other hand, in the present embodiment, a cover 702 of the lens substrate ASSY 1 and a welding ring 701 are separated, and a camera case 3 and the lens substrate ASSY 1 are welded by the welding ring 701 after the lens substrate ASSY 1 and a substrate 6 are housed in the camera case 3.

In the present embodiment, similarly to the first and second embodiments, the camera case 3 is a rectangular box-shaped housing having an opening on an upper surface 6*a* side of the substrate 6. The lens substrate ASSY 1 includes the cover 702 that is partly housed in the camera case 3 so as to close (or cover) an opening 34. The welding ring 701 is an example of a welding member that is provided outside the camera case 3, abuts on the camera case 3 and the cover 702, and is welded to the camera case 3 and the cover 702 by laser radiation.

In the present embodiment, as illustrated in FIG. 9, the camera case 3 includes four catch members 703 that are provided at corners inside the camera case 3 to support the cover 702 housed in the camera case 3. Each of the catch members 703 is an example of a catch member that is made of resin or the like and fixes a position of the lens substrate ASSY 1 in an insertion direction of the lens substrate ASSY 1 into the camera case 3 from the opening 34. Moreover, in the present embodiment, when the lens substrate ASSY 1 and the substrate 6 are housed in the camera case 3, an upper end of a shield 5 is brought into contact with the cover 702, and a central part (inner side) of the cover 702 is supported by a reaction force of the shield 5.

Conventionally, in a structure that the lens substrate ASSY 1 and the welding ring 701 are divided into two parts, it is necessary to perform laser radiation twice in welding of the camera case 3 and the welding ring 701 and welding of the lens substrate ASSY 1 and the welding ring 701. That is, conventionally, prior to housing of the lens substrate ASSY 1 in the camera case 3, the lens substrate ASSY 1 and the welding ring 701 are placed on a completely fixed jig, and laser radiation is performed in a state where the lens substrate ASSY 1 and the welding ring 701 are pressed by external equipment. Moreover, conventionally, the catch members 703 in the camera case 3 are not provided, so that laser radiation for welding the camera case 3 and the welding ring 701 and laser radiation for welding the lens substrate ASSY 1 and the welding ring 701 have to be performed twice.

On the other hand, in the present embodiment, the camera case 3 includes four catch members 703 to fix the position of the lens substrate ASSY 1 in the insertion direction of the lens substrate ASSY 1 into the camera case 3 from the opening 34. Similarly to the case of using the jig, in the camera case 3, the fixing situation of a positional relationship between the lens substrate ASSY 1 and the welding ring 701 can be created by the catch members 703 and the shield 5. As a result, it is possible to simultaneously weld the lens substrate ASSY 1 and the welding ring 701 and weld the camera case 3 and the welding ring 701 after the lens substrate ASSY 1 is housed in the camera case 3.

Figure 10:
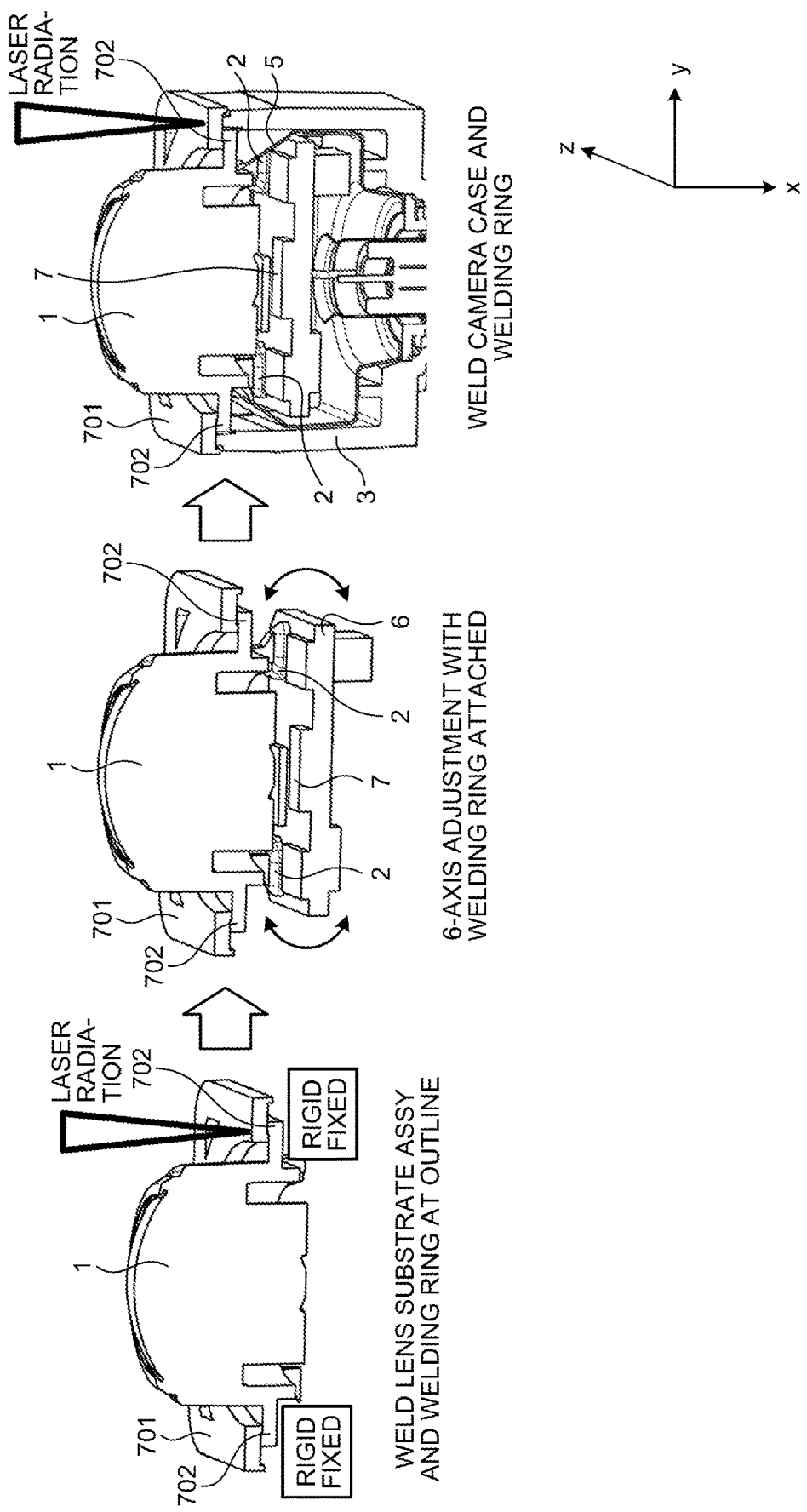
FIG. 10 is a diagram for explaining an example of a welding structure of a lens substrate ASSY, a camera case, and a welding ring in a conventional in-vehicle camera.
Figure 11:
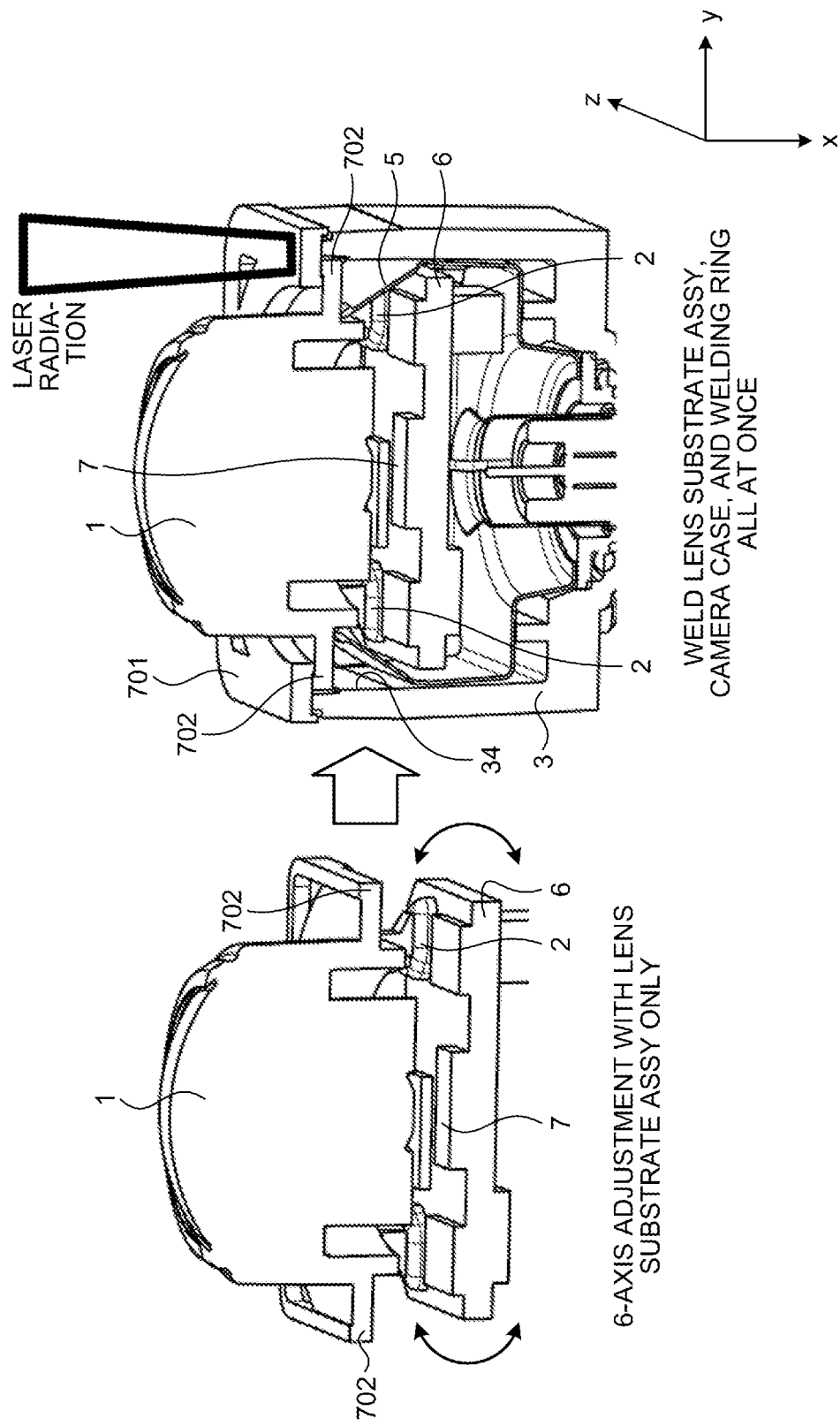
FIG. 11 is a diagram for explaining an example of a welding structure of a lens substrate ASSY, a camera case, and a welding ring in the in-vehicle camera according to the third embodiment.

FIG. 10 is a diagram for explaining an example of a welding structure of the lens substrate ASSY, the camera case, and the welding ring in a conventional in-vehicle camera. FIG. 11 is a diagram for explaining an example of a welding structure of the lens substrate ASSY, the camera case, and the welding ring in the in-vehicle camera according to the third embodiment. Next, an example of a welding structure of the lens substrate ASSY 1, the camera case 3, and the welding ring 701 in the in-vehicle camera according to the present embodiment will be described with reference to FIGS. 10 and 11.

As illustrated in FIG. 10, in the conventional method of manufacturing an in-vehicle camera, prior to housing of the lens substrate ASSY 1 in the camera case 3, the lens substrate ASSY 1 and the welding ring 701 are placed on a completely fixed jig, and laser radiation is performed in a state where the lens substrate ASSY 1 and the welding ring 701 are pressed down by external equipment (a state where RIGID is fixed). Next, in the conventional method of manufacturing an in-vehicle camera, after six-axes alignment is performed in a state where the welding ring 701 is welded to the lens substrate ASSY 1, the lens substrate ASSY 1 and the substrate 6 are housed in the camera case 3. Thereafter, in the conventional method of manufacturing an in-vehicle camera, the welding ring 701 is pressed by an external force (for example, an external force of 200 to 300 N) of the camera case 3, and the welding ring 701 is irradiated with laser again to weld the camera case 3 and the welding ring 701.

On the other hand, in the method of manufacturing the in-vehicle camera 10 according to the present embodiment, the six-axes alignment is performed only with the lens substrate ASSY 1, and then the lens substrate ASSY 1 and the substrate 6 are housed in the camera case 3. At that time, the catch members 703 fix a position of the lens substrate ASSY 1 in the insertion direction of the lens substrate ASSY 1 into the camera case 3 from the opening 34. Thereafter, in the method of manufacturing the in-vehicle camera 10 according to the present embodiment, laser radiation is performed on the welding ring 701 in a state where the welding ring 701 is pressed by an external force (for example, an external force of 200 to 300 N), and welding of the cover 702 of the lens substrate ASSY 1 and the welding ring 701 and welding of the camera case 3 and the welding ring 701 are realized at once.

As described above, according to the in-vehicle camera 10 of the third embodiment, similarly to the case of using the jig, in the camera case 3, the fixing situation of the positional relationship between the lens substrate ASSY 1 and the welding ring 701 can be created by the catch members 703 and the shield 5. As a result, it is possible to simultaneously weld the lens substrate ASSY 1 and the welding ring 701 and weld the camera case 3 and the welding ring 701 after the lens substrate ASSY 1 is housed in the camera case 3.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imaging device comprising:
   a lens unit including a lens barrel in which a lens is disposed;
   a substrate disposed on an emission side of light from the lens barrel, the substrate including a first surface on which an imaging element receiving the light is mounted;
   a housing that houses the lens unit and the substrate;
   a shield provided in the housing to face the first surface of the substrate; and
   a heat dissipation member provided between the shield and the substrate;
   wherein
   the shield is provided to obliquely extend from a side edge of the substrate toward a position facing the first surface,
   the shield has a length in a first direction orthogonal to the substrate, the length being longer than an inner dimension of the housing covering a side part of the substrate in the first direction,
   the shield is inclined toward an inside of the housing along the lens unit when the lens unit and the substrate are inserted into the housing,
   the shield includes multiple holes at positions of the substrate in the first direction,
   the multiple holes include holes provided at a center and an end of the shield in a second direction orthogonal to the first direction,
   the multiple holes further include a hole provided at a second end of the shield opposite to a first end of the shield, the first end contacting with the lens unit among ends of the shield in the first direction, and
   the heat dissipation member is pushed out between the shield and the housing by the substrate via the multiple holes when the lens unit and the substrate are inserted into the housing.

2. The imaging device according to claim 1, wherein
   the shield includes a first shield pair and a second shield pair, the first shield pair being constituted by plate-shaped members disposed to face each other, the second shield pair being constituted by plate-shaped members partly overlapping with end parts of the first shield pair and disposed to face each other, and
   the first shield pair is inclined toward the inside of the housing with a time difference from the second shield pair when the lens unit and the substrate are inserted into the housing.

3. The imaging device according to claim 1, wherein the lens unit includes a contact part contacting with the shield, the contact part being formed of a resin material.

4. The imaging device according to claim 2, wherein the lens unit includes a contact part contacting with the shield, the contact part being formed of a resin material.

5. The imaging device according to claim 1, wherein the shield includes a hemmed edge contacting with the lens unit.

6. The imaging device according to claim 2, wherein the shield includes a hemmed edge contacting with the lens unit.

7. The imaging device according to claim 1, wherein the lens unit further includes a stopper that, after the first surface is covered with the shield, suppresses inclination of the shield to the inside of the housing and pushes out a position of the substrate of the shield in the first direction to an outside of the housing.

8. An imaging device comprising:
   a lens unit including a lens barrel in which a lens is disposed;
   a substrate disposed on an emission side of light from the lens barrel, the substrate including a first surface on which an imaging element receiving the light is mounted;
   a housing that houses the lens unit and the substrate; and
   a shield provided in the housing to face the first surface of the substrate;
   wherein the shield is provided to obliquely extend from a side edge of the substrate toward a position facing the first surface, the shield has a length in a first direction orthogonal to the substrate, the length being longer than an inner dimension of the housing covering a side part of the substrate in the first direction, the shield is inclined toward an inside of the housing along the lens unit when the lens unit and the substrate are inserted into the housing, the housing is a rectangular box-shaped housing including an opening on a side of the first surface, the lens unit includes a cover that is housed in the housing to close the opening, and the imaging device further comprises:
- a welding member provided outside the housing, the welding member abutting on the housing and the cover, the welding member being welded to the housing and the cover by laser radiation; and
- catch members provided at corners inside the housing, the catch members supporting the cover to fix a position of the lens unit in an insertion direction of the lens unit into the housing from the opening.

9. A method of manufacturing an imaging device, the imaging device including: a lens unit including a lens barrel in which a lens is disposed; a substrate disposed on an emission side of light from the lens barrel, the substrate including a first surface on which an imaging element receiving the light is mounted; a housing that houses the lens unit and the substrate; a shield provided in the housing to face a side part and the first surface of the substrate, the shield having a length in a first direction orthogonal to the substrate, the length being longer than an inner dimension of the housing covering the side part of the substrate in the first direction; and a heat dissipation member provided between the shield and the substrate, the shield including multiple holes at positions of the substrate in the first direction, the multiple holes including holes provided at a center and an end of the shield in a second direction orthogonal to the first direction, the multiple holes further including a hole provided at a second end of the shield opposite to a first end of the shield, the first end contacting with the lens unit, the method comprising:

when the lens unit and the substrate are inserted into the housing,
- inclining the shield toward an inside of the housing along the lens unit; and
- pushing out the heat dissipation member between the shield and the housing by the substrate via the multiple holes.

10. The method according to claim 9, further comprising, after the first surface is covered with the shield,
- suppressing inclination of the shield to the inside of the housing and pushing out a position of the substrate of the shield in the first direction to an outside of the housing by a stopper included in the lens unit.

11. The method according to claim 9, wherein
the housing is a rectangular box-shaped housing including an opening on a side of the first surface, and
the lens unit includes a cover that is housed in the housing to close the opening, and
the method further comprises:
- supporting the cover, by catch members provided at corners inside the housing, to fix a position of the lens unit in an insertion direction of the lens unit into the housing from the opening; and
- bringing a welding member provided outside the housing into contact with the housing and the cover, and welding the welding member to the housing and the cover by laser radiation.

12. The method according to claim 10, wherein
the housing is a rectangular box-shaped housing including an opening on a side of the first surface, and
the lens unit includes a cover that is housed in the housing to close the opening, and
the method further comprises:
- supporting the cover, by catch members provided at corners inside the housing, to fix a position of the lens unit in an insertion direction of the lens unit into the housing from the opening; and
- bringing a welding member provided outside the housing into contact with the housing and the cover, and welding the welding member to the housing and the cover by laser radiation.

\* \* \* \* \*